(12) United States Patent
Takenaka et al.

(10) Patent No.: US 6,297,868 B1
(45) Date of Patent: Oct. 2, 2001

(54) LIQUID CRYSTAL DISPLAY DEVICE

(75) Inventors: Yuuichi Takenaka; Yoshiyuki Tsujita, both of Mobara (JP)

(73) Assignees: Hitachi, Ltd., Tokyo; Hiatchi Device Engineering. Co., Ltd., Mobara, both of (JP)

( * ) Notice: Subject to any disclaimer, the term of this patent is extended or adjusted under 35 U.S.C. 154(b) by 0 days.

(21) Appl. No.: 09/443,104

(22) Filed: Nov. 18, 1999

(30) Foreign Application Priority Data

Nov. 20, 1998 (JP) .................................................. 10-330357

(51) Int. Cl.[7] .................................................. G02F 1/1345
(52) U.S. Cl. ............................................. 349/151; 349/152
(58) Field of Search ..................................... 349/149, 150, 349/151, 152

(56) References Cited

U.S. PATENT DOCUMENTS 5,864,377 * 1/1999 Kim ..................................... 349/150

* cited by examiner

*Primary Examiner*—James A. Dudek
(74) *Attorney, Agent, or Firm*—Antonelli, Terry, Stout & Kraus, LLP

(57) ABSTRACT

A liquid crystal display device is constructed so as to be capable of avoiding the occurrence of an electrical short circuit between adjacent bumps of a driver IC. In the liquid crystal display device on which a driver IC is mounted with an anisotropic conductive film interposed therebetween, the width of a space between one of the bumps of the driver IC and another bump to which the one of the bumps is adjacent becomes larger toward the central side of the driver IC.

6 Claims, 7 Drawing Sheets

LIQUID CRYSTAL DISPLAY DEVICE

BACKGROUND OF THE INVENTION

The present invention relates to a liquid crystal display device and, more particularly, to an improvement in a semiconductor driving circuit which is mounted on the same.

A liquid crystal display panel which constitutes a liquid crystal display device utilizes, as a chamber for the liquid crystal, transparent substrates arranged to oppose each other with the liquid, crystal interposed therebetween. This liquid crystal display panel has a multiplicity of pixels formed in the area of the liquid crystal.

Means for producing an electric field is incorporated in each of the pixels to control the optical transmissivity of the liquid crystal of individual pixels. To provide this control, semiconductor driving circuits (hereinafter referred to as driver ICs) for supplying signals (voltages) to the electric field producing means of the respective pixels via signal lines are mounted on the peripheral portion of the liquid crystal display panel. If this mounting is adopted, one of the transparent substrates which constitute the panel is formed to extend beyond the other substrate at a peripheral portion of the liquid crystal display panel, and the driver ICs are mounted on this extended area. Accordingly, interconnecting layers which are connected to the input-side bumps of the driver ICs and interconnecting layers which are connected to the output-side bumps of the, driver ICs and supply signals to the respective pixels are formed in the extended area. The driver ICs are mounted on the extended area by so-called facedown-bonding in which their bumps are connected to the respective interconnecting layers with an anisotropic conductive film (ACF) interposed therebetween.

Surface-mount technologies of the aforementioned driver ICs for one of the substrates of the liquid crystal display panel are disclosed for example in Japanese Patent Application Laid-Open JP-A-172385/1987. Bump structures for semiconductor integrated circuit devices are disclosed for example in Japanese Patent Application Laid-Open JP-A-368130/1992 and Japanese Patent Application Laid-Open JP-A 166810/1993.

SUMMARY OF THE INVENTION

However, in recent years, it has been found that an electrical short circuit may occur between adjacent bumps of such a driver IC because of the trends toward larger size liquid crystal display panels and a finer-pitch arrangement of bumps on the driver IC.

From an investigation into the cause of this phenomenon, it has been found that, during thermocompression bonding in the process, of mounting a driver IC on a liquid crystal display device with an anisotropic conductive film (ACF) interposed therebetween, the binder contained in the anisotropic conductive film (ACF) is reduced in viscosity and fluidized, and while the binder is being discharged from between adjacent bumps, the conductive material mixed with the binder forms a residue (or a drift) between bumps.

The present invention is directed to the above-described problems, and an object of the present invention is to provide a liquid crystal display device which is capable of avoiding the occurrence of an electrical short circuit between adjacent bumps of a driver IC.

A representative aspect of the invention disclosed in the present application will be described below in brief.

One liquid crystal display device according to the present invention is characterized in that driver ICs are mounted on the liquid crystal display device with an anisotropic conductive film interposed therebetween and each of the driver ICS has bumps arranged in such a manner that the width of the space between one bump and an adjacent bump becomes larger toward a central side of each of the driver ICs.

In the liquid crystal display device constructed in this manner, the binder contained in the anisotropic conductive film (ACF) can be smoothly discharged without allowing the conductive material mixed with the binder to form a residue between adjacent bumps, in the process of reducing the viscosity of and fluidizing the binder of the anisotropic conductive film (ACF) and discharging the fluidized binder through the spaces between the adjacent bumps during the thermocompression bonding of the driver ICs. Accordingly, an electrical short circuit is prevented from occurring due to the conductive material between the adjacent bumps.

This feature offers a huge number of great advantages in the present situation in which the trend is to narrow the gaps between adjacent bumps of a driver IC and reduce the area of each of the bumps and in which it is necessary to increase the amount of the conductive material to be mixed with the binder in the anisotropic conductive film (ACF).

These and other objects, features and advantages of the present invention will become more apparent from the following description when taken in conjunction with the accompanying drawings.

DETAILED DESCRIPTION

Embodiments of a liquid crystal display device according to the present invention will be described below with reference to the drawings.

<<Equivalent Circuit>>

Figure 2:
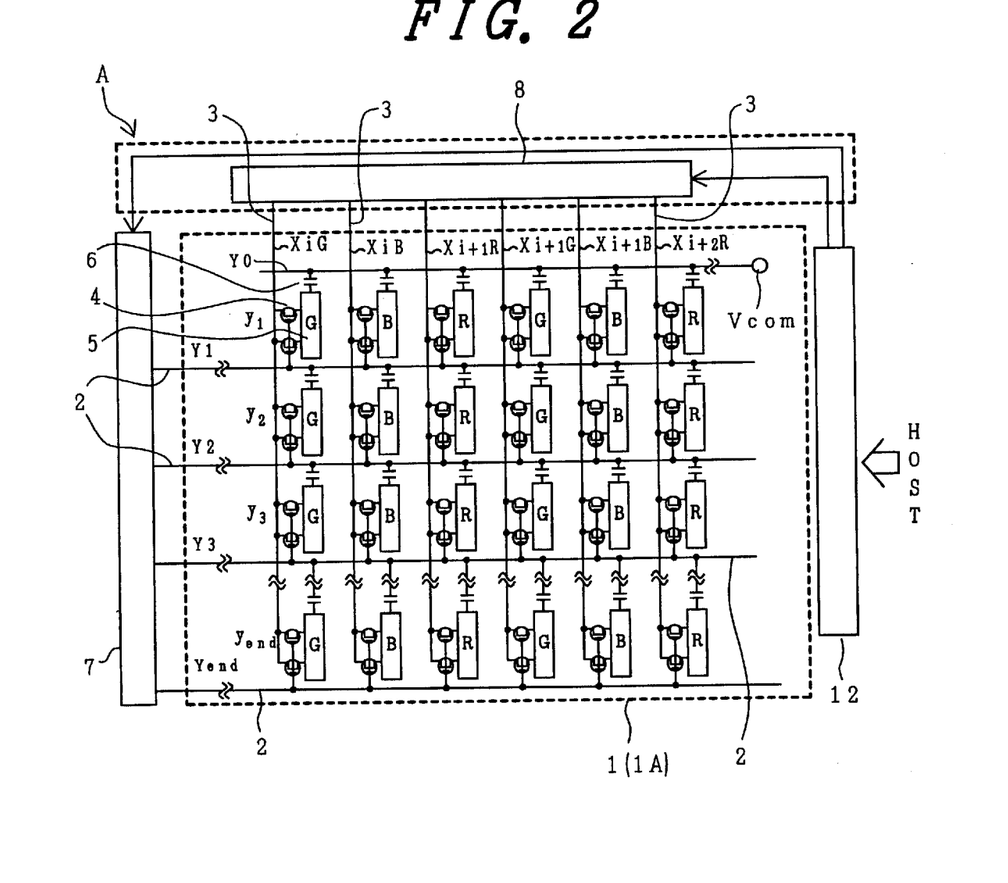
FIG. 2 is an equivalent circuit diagram showing one embodiment of the liquid crystal display device according to the present invention.

FIG. 2 is an equivalent circuit diagram showing one embodiment of the liquid crystal display device according to the present invention, which circuit diagram is drawn according to an actual geographic arrangement.

In FIG. 2, the liquid crystal display panel 1 has a pair of transparent substrates which are arranged to oppose each other with a liquid crystal interposed therebetween, and scanning signal lines 2 and video signal lines 3 are formed over a liquid crystal-side surface of one transparent substrate 1A. The scanning signal lines 2 extend in the x direction of the liquid crystal-side surface and are juxtaposed in the y direction thereof, while the video signal lines 3 are insulated from the scanning signal lines 2 and extend in the y direction and are juxtaposed in the x direction.

Each rectangular area surrounded by adjacent ones of the scanning signal lines 2 and adjacent ones of the video signal lines 3 constitutes a pixel area, and a switching element 4 and a pixel electrode 5 are formed in each pixel area. The switching element 4 is turned on by the supply of a scanning signal from one of the adjacent scanning signal lines 2, and the pixel electrode 5 is supplied with a video signal from one of the adjacent video signal lines 3 via the switching element 4, when it is turned on. This pixel electrode 5 is transparent and is made from, for example, an ITO (Indium-Tin-Oxide) layer. An added capacitive element 6 is formed between the pixel electrode 5 and the other of the adjacent scanning signal lines 2, and an electric charge which corresponds to a video signal supplied to the pixel electrode 5 is stored for a comparatively long time by this added capacitive element 6.

A transparent common electrode which is common to each pixel area is formed over a liquid crystal-side surface of the other transparent substrate (not shown) which is arranged to oppose the transparent substrate 1A which is constructed in this manner, with the liquid crystal interposed therebetween. The optical transmissivity of the liquid crystal between the common electrode and the pixel electrode 5 is controlled by an electric field which occurs therebetween.

A scanning signal is supplied to one end of each of the scanning signal lines 2 from a vertical scanning circuit 7 via a terminal. The vertical scanning circuit 7 is constructed of a plurality of semiconductor devices (driver ICs). These driver ICs are mounted (flip-chip-mounted) on the peripheral portion of the transparent substrate 1A. The scanning signal lines 2 are divided into groups each including adjacent scanning signal lines, and one driver IC is responsible for each scanning signal line of each of the groups.

Similarly, a video signal is supplied to one end of each of the video signal lines 3 from a video signal driving circuit 8 via a terminal. This video signal driving circuit 8 is also constructed of a plurality of semiconductor devices (driver ICs). These driver ICs are mounted on the peripheral portion of the transparent substrate 1A. The video signal lines 3 are divided into groups each including adjacent video signal lines, and one driver IC is responsible for each video signal line of each of the groups.

A printed circuit board is arranged in the peripheral portion of the liquid crystal display panel 1, and a power supply circuit and a conversion circuit (CRT=>TFT) for signals and the like are mounted on the printed circuit board. Electric power and signals from the power supply circuit and the conversion circuit are supplied to the vertical scanning circuit 7 and the video signal driving circuit 8.

<<Construction in the Vicinity of Driver IC>>

Figure 3:
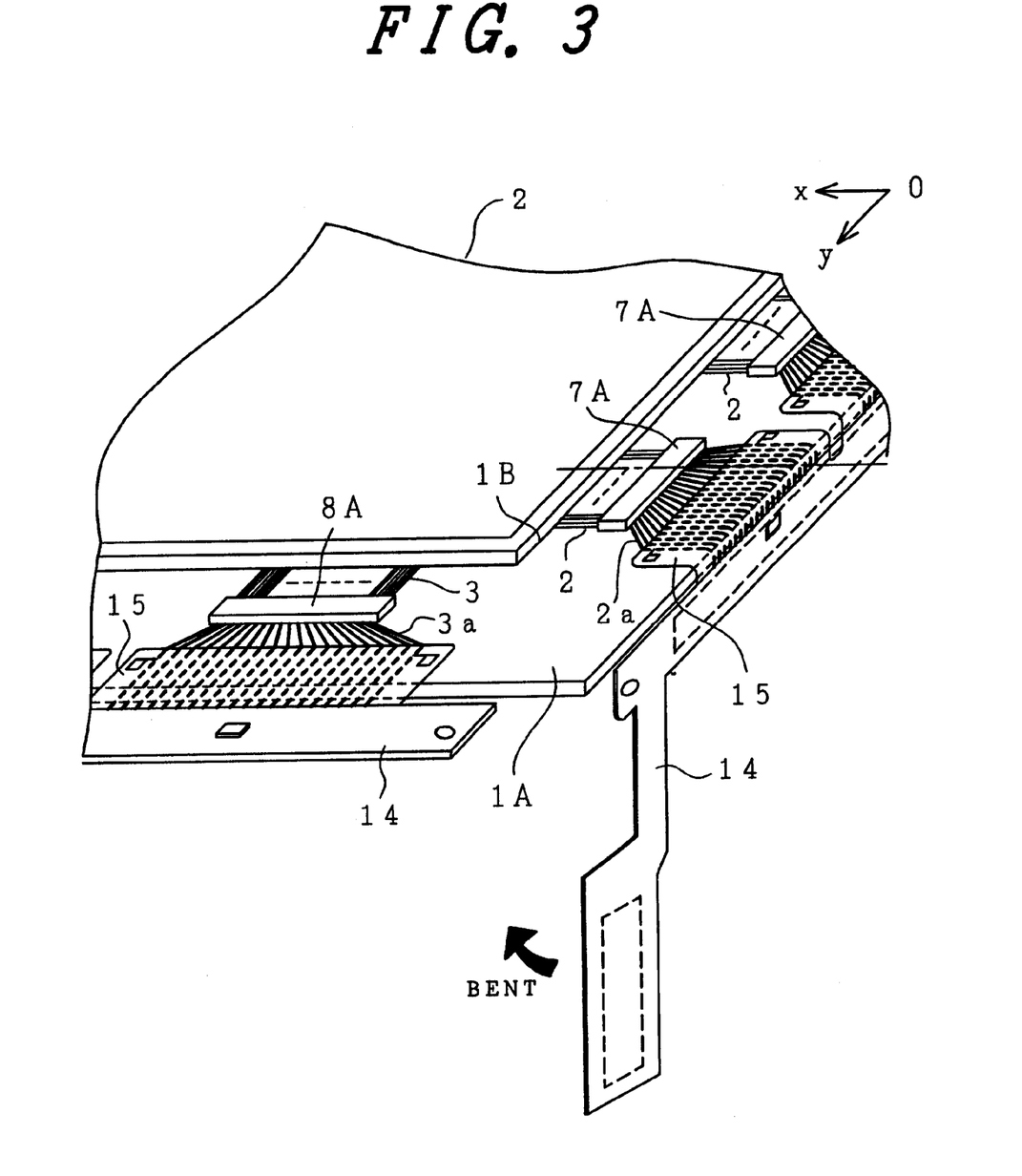
FIG. 3 is a fragmentary perspective view showing one embodiment of the liquid crystal display device according to the present invention.

FIG. 3 is a perspective view (as viewed in the direction an arrow A of FIG. 2) showing a driver IC 7A which constitutes the vertical scanning circuit 7 mounted on the transparent substrate 1A (the liquid crystal display panel 1) and a driver IC 8A which constitutes the video signal driving circuit 8. The peripheral portion of the transparent substrate 1A on which the driver ICS 7A and 8A are mounted is formed to extend outward from a transparent substrate 1B. Each of the scanning signal lines 2 is disposed to extend into this extended area and is connected at one end to an output-side bump of the driver IC 7A. Similarly, each of the video signal lines 3 is disposed to extend into the extended area and is connected at one end to an output-side bump of the driver IC 8A.

A flexible printed circuit board 14 is arranged in the peripheral portion of the transparent substrate 1A (the liquid crystal display panel 1), and the above-described power supply circuit and conversion circuit (CRT=>TFT) for signals and the like are mounted on this flexible printed circuit board 14. The flexible printed circuit board 14 is secured to the liquid crystal display panel 1 by connecting its respective terminals to terminals formed on the transparent substrate 1 A. The terminals formed on the transparent substrate 1A are respectively connected to the input terminals of the driver ICs 7A and to those of the driver ICs 8A via interconnecting layers 2a and 3a.

<<Construction of Transparent Substrate 1A in the Vicinity of Driver IC>>

Figure 4:
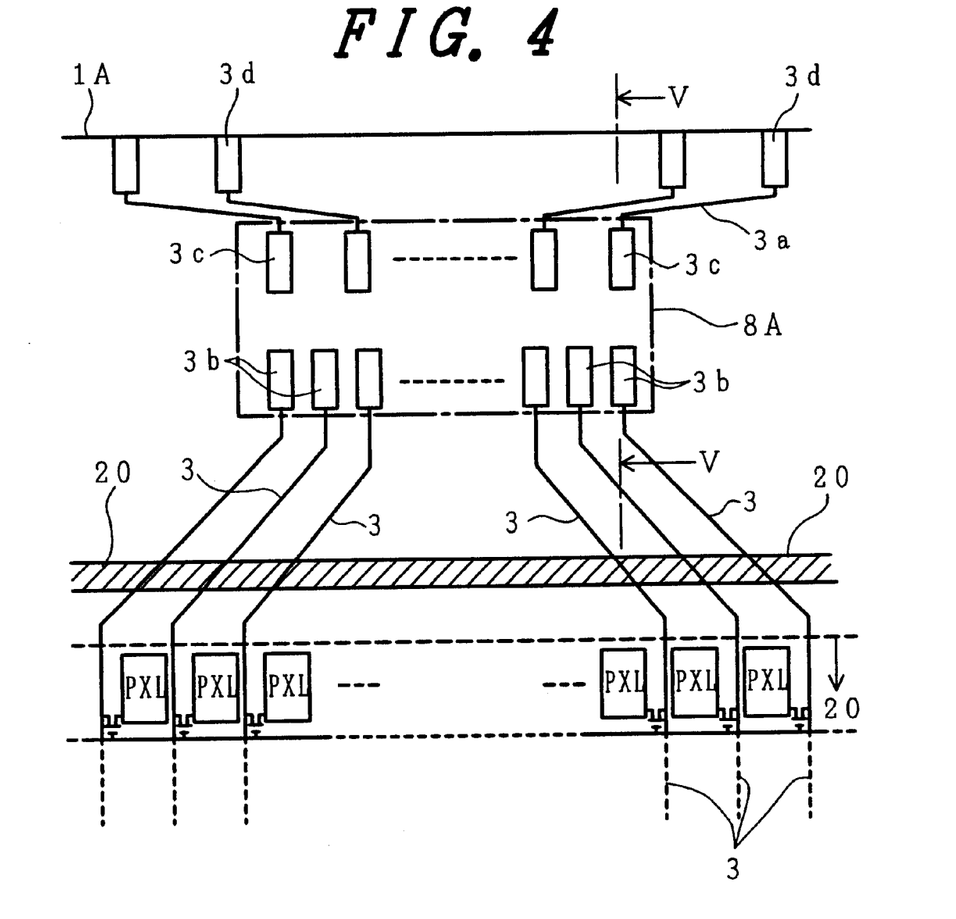
FIG. 4 is a plan view showing one embodiment in the vicinity of a portion in which are mounted the driver ICs of the liquid crystal display device according to the present invention.

FIG. 4 is a plan view showing the construction of the transparent substrate 1A in the vicinity of one of, for example, the driver ICs 8A (an identical construction is also used for the drivers IC 7A).

The video signal lines 3, which are arranged adjacent to one another, are formed as one group to extend to the periphery of the transparent substrate 1A across a sealing material 20 and to converge closer to one another toward the periphery. A terminal 3b to be connected to the output-side bump of the driver IC 8A is formed at one end of each of the video signal lines 3.

The sealing material 20 has a function for retaining the gap between the transparent substrates 1A and 1B, at a predetermined value and sealing the liquid crystal interposed between the transparent substrates 1A and 1B, and is normally formed nearly along the outside contour of the transparent substrate 1B.

In addition, terminals 3c are formed to be connected to input-side bumps of the driver IC 8A, respectively, and are connected to terminals 3d formed in the peripheral portion of the transparent substrate 1A via the interconnecting layers 3a. The terminals 3d are connected to the above-described terminals of the flexible printed circuit board 14.

As is apparent from the numbers of the terminals 3b and 3c, the number of the output-side bumps of the driver IC 8A is larger than the number of the input-side bumps of the driver IC 8A. This is because the number of output signals is larger than the number of input signals.

<<Mounting Structure of Driver IC>>

Figure 5:
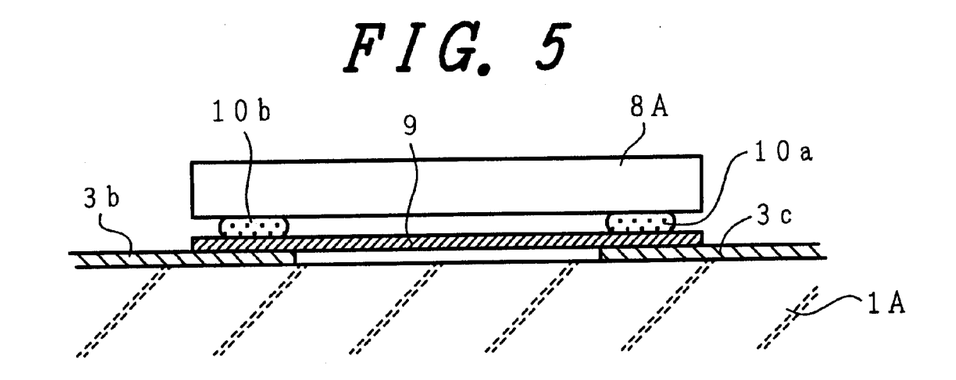
FIG. 5 is a cross-sectional view taken along line V—V of FIG. 4.

FIG. 5 is a cross-sectional view taken along line V—V of FIG. 4.

A plurality of input-side bumps 10a and a plurality of output-side bumps 10b are formed on the main surface of the driver IC 8A, and the driver IC 8A is faced down on the transparent substrate 1A so that the input-side bumps 10a and the output-side bumps 10b are made to abut with the terminals 3c and 3b, respectively.

In this embodiment, an anisotropic conductive film 9 is interposed between the transparent substrate 1A and the driver IC 8A which is faced down, and the input-side bumps 10a and the output-side bumps 10b of the driver IC 8A are respectively bonded to the terminals 3c and 3b by thermocompression bonding, thereby providing electrical connection. The anisotropic conductive film 9 has the nature of exhibiting a conductivity in the thickness direction but exhibiting no conductivity in the longitudinal direction thereof, and is made from a binder which contains a multiplicity of conductive materials.

<<Structure of Bump of Driver IC>>

Figure 1:
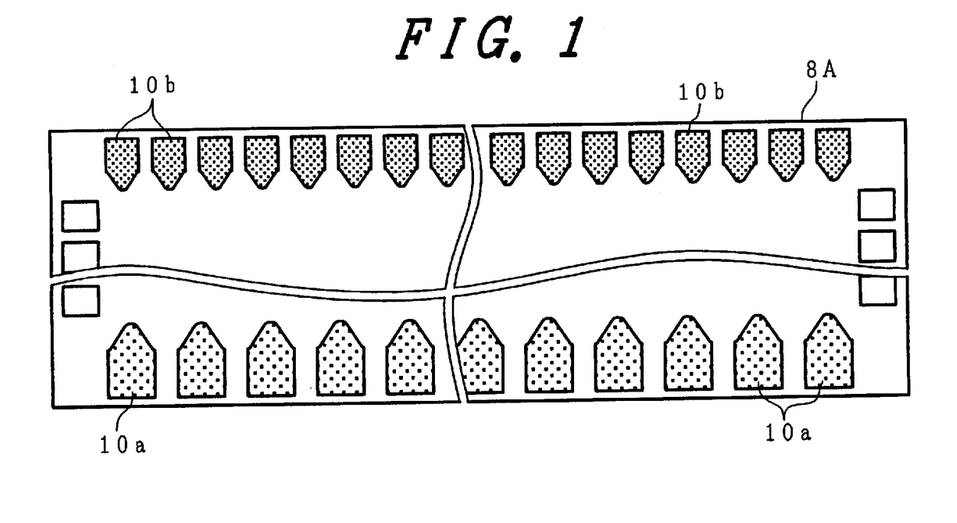
FIG. 1 is a plan view showing one embodiment of a driver IC of a liquid crystal display device, according to the present invention.

FIG. 1 is a plan view showing the main surface of the driver IC 8A on which the bumps are formed (an identical construction is also used for the driver IC 7A).

In FIG. 1, the plurality of input-side bumps 10a are juxtaposed along one side of the driver IC 8A. In addition, the plurality of output-side bumps 10b are juxtaposed along the side of the driver IC 8A opposite to the one side. Each of the bumps 10a and 10b is formed in, for example, a parabolic shape having a vertex on a side which faces the center line between the row of the juxtaposed input-side bumps 10a and the row of the juxtaposed output-side bumps 10b, and is formed in a rectangular shape in the portion other than the parabolic portion (on the outward side of the driver IC 8A). In other words, the width of the space between any one of the bumps and an adjacent bump is larger toward the central side of the driver IC. Moreover, if the spaces between the adjacent bumps are regarded as paths from the center to the outside of the driver IC 8A, the paths are wide at their entrances, and become gradually narrower.

Figure 6:
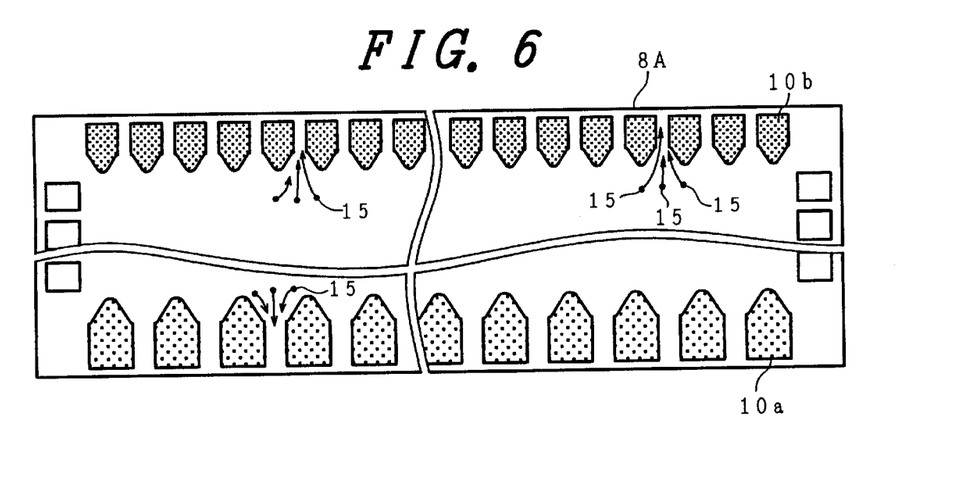
FIG. 6 is a plan view of driver ICs illustrating the advantages of the present invention.

If the bumps are constructed in this manner, the binder mixed with the anisotropic conductive film (ACF) can be smoothly discharged without allowing a conductive material 15 mixed in the binder to form a residue (a drift, in the other word) between adjacent bumps, in the process of reducing the viscosity of and fluidizing the binder of the anisotropic conductive film (ACF) and discharging the fluidized binder through the spaces between the adjacent bumps, as shown in FIG. 6 by way of example, during the thermocompression bonding of the driver IC.

Figure 9A:
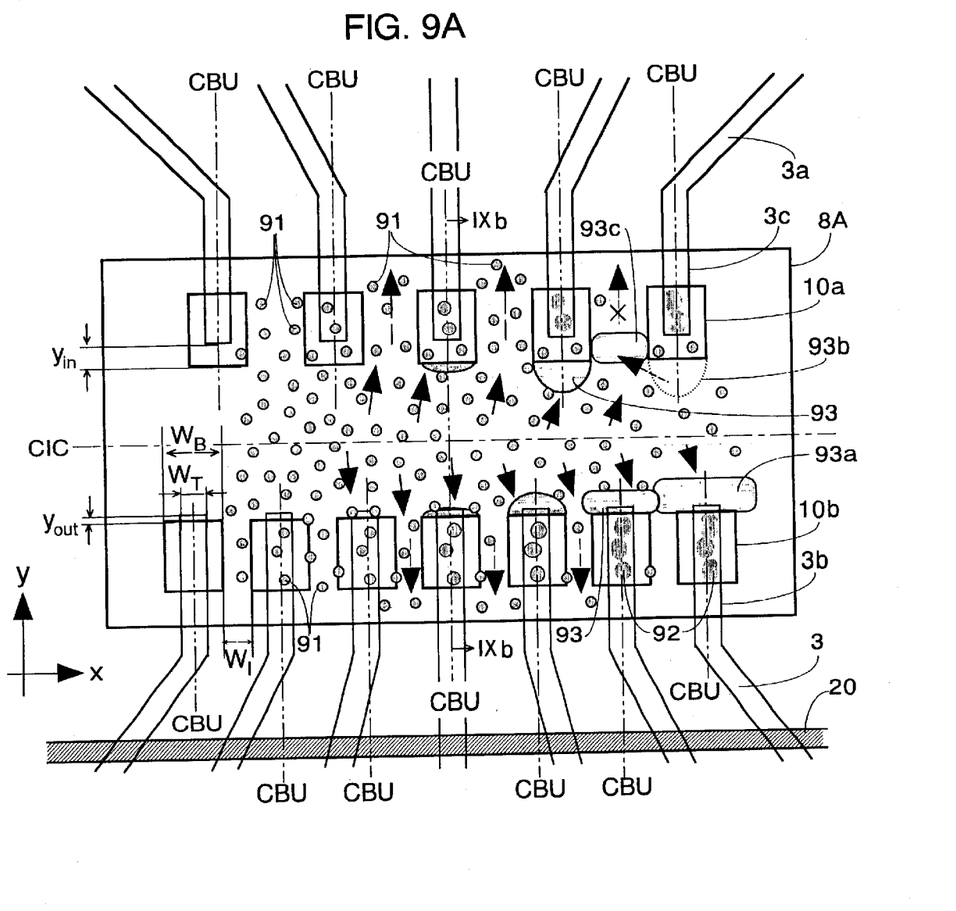
FIG. 9A is a plan view of a peripheral portion (for mounting a driver IC) of a substrate utilized for one example of a conventional liquid crystal display device for explaining electrical short circuits being caused between bumps thereat.
Figure 9B:
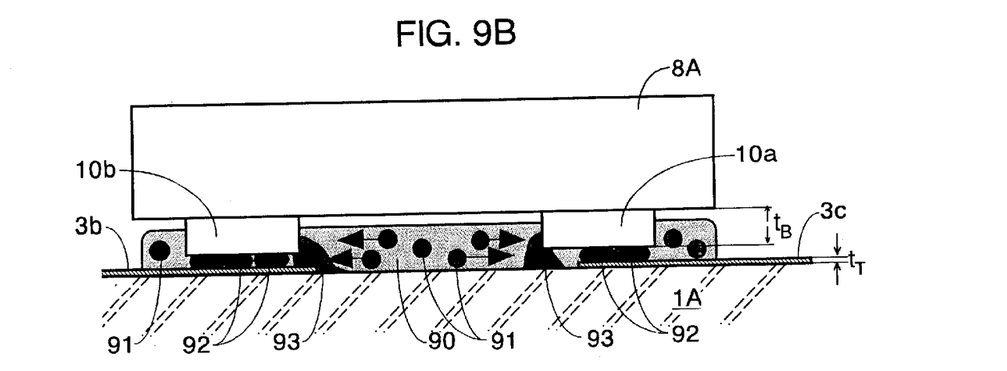
FIG. 9B is a cross-sectional view taken along the line IXb—IXb of FIG. 9A.

The reason why the aforementioned bump structure prevents the conductive materials (conductive particles) from forming the aforementioned residue (drift) will be explained with reference to a process of formation of the residue in the conventional bump structures. FIG. 9A is a plan view showing that the driver IC having bumps of the conventional shape are mounted on one of a pair of substrates of a liquid crystal display panel, and FIG. 9B is a cross-sectional view taken along the line IXb—IXb of FIG. 9A. In FIG. 9A, a driver IC like that shown in FIG. 1 (but, having different bump shapes) is turned upside down and is mounted on a main surface of the substrate having terminals like those shown in FIG. 4 (so-called "facedown-mounting"). In the driver IC 8A shown in FIG. 9A, signals and electric power from an external circuit are inputted thereto through five terminals 3c formed on the main surface of the substrate 1A, and signals generated therein are outputted to seven terminals 3b formed on the main surface of the substrate 1A. The bump surfaces of the driver IC 8A being connected to the respective terminals 3b, 3c have a rectangular shape as shown in FIG. 9A. The driver IC 8A is mounted on the surface of the substrate 1A so that the respective center lines CBU of the bumps 10a, 10b extending along a width direction of the driver IC 8A (y-direction in FIG. 9A) are coincident with those of the terminals 3c, 3b corresponding thereto substantially. The respective widths of the output-side bumps 10b in a juxtaposition direction thereof (x-direction in FIG. 9A) WB are broader than the widths of the terminals 3b corresponding thereto in this direction $W_T$ and an interval of juxtaposition thereof $W_I$. The relationship of $W_B > W_T$ exists also between the input-side bumps 10a and the terminals 3c corresponding thereto. As each of the bumps 10a, 10b has a rectangular shape, each of the, bumps has a plane (a surface) facing the central line CIC of a width (in the y-direction) of the driver IC 8A extending along a juxtaposition direction (the x-direction) of the bumps at an end side of the terminal corresponding thereto. The bump end at the end side of the terminal protrudes from the end of the terminal in $y_{in}$ at the input-side of the driver IC 8A, and is pulled back from the end of the terminal in $Y_{out}$ at the output-side of the driver IC 8A.

Although FIG. 9B looks similar to the cross-sectional view of FIG. 5, it reflects deformations of the binder 90 and the conductive materials 91 of the anisotropic conductive film during the thermocompression process. As FIG. 9B shows, the bump thickness this thicker than the terminal thickness $t_T$.

FIG. 9A shows the behaviors of the conductive materials (the conductive particles) 91 in the binder 90 during the thermocompression process from the left side to the right side in time-series. Some of the conductive materials 91 being dispersed in the binder 90 (formed of a material having lower electrical conductivity than that of the conductive materials or an insulating material) which are distributed between the bump and the terminal corresponding thereto come into contact both with an upper surface of the terminal and with a lower surface due to binder shrinkage, and are deformed thereby. Due to these deformations, the conductive materials 91 therebetween provide a conductive path 92 between the upper surface of the terminal and the lower surface of the bump. During the thermocompressing process, the temperature of a part of the anisotropic conductive film lying under the bump and at a periphery thereof (depending on the circumstances, including other part lying under a central part of the driver IC) rises higher, and thus the binder 90 contained in this part loses its viscosity. This viscosity decrease (fluidization) of the binder 90 promotes the formation of a conductive path 92 between the upper surface of the terminal 3c or 3b and the lower surface of the bump 10a or 10b, but makes the conductive materials 91 move about unexpectedly around the bumps. According to the flow of the fluidized binder 90, some of the conductive materials 91 drift from a region under the central part of the driver IC8A toward other regions under the periphery thereof. On the other hand, since the plane of each of the bumps 10a, 10b facing the central line CIC of the driver IC 8A dams back the stream of the fluidized binder 90, the conductive materials 91 drifting ashore at the plane are accumulated thereat gradually and form a cluster 93. Consequently, one of the clusters 93a becomes so large that it is united with one of the other clusters 93 adjacent thereto and forms a conductive path between the bumps 10b. Moreover, the other of the clusters 93c is released from its growth place 92 unexpectedly, occupies the space between the bumps 10a, and form a conductive path therebetween.

Figure 10:
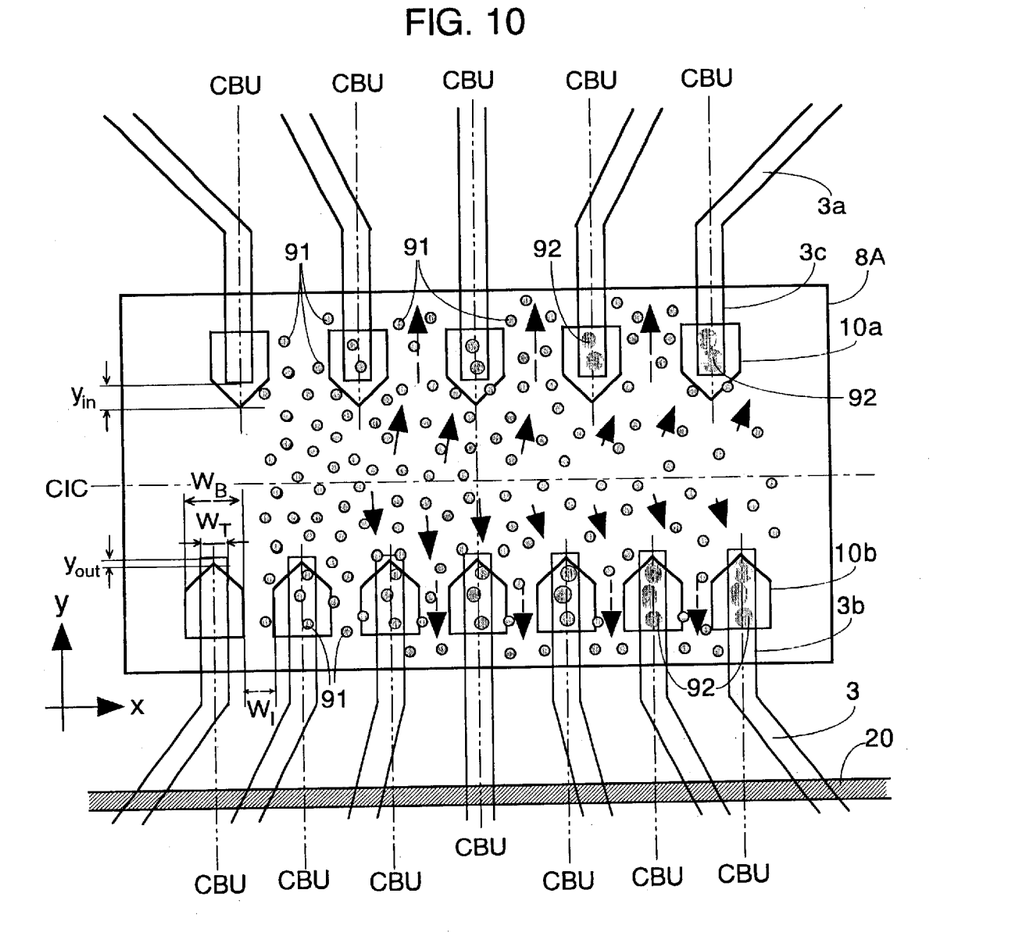
FIG. 10 is a plan view of a peripheral portion (for mounting a driver IC) of a substrate utilized for the liquid crystal display device according to the present invention for explaining behaviors of conductive materials of an anisotropic conductive film thereat.

For preventing an electrical short circuit between the bumps caused by the aforementioned conductive path formed therebetween, the present invention reduces the bump width $W_B$ in the x-direction toward the center of the driver IC 8A, as FIG. 10 shows. It is preferable that the bump end facing the central line CIC of the driver IC 8A has at least one plane having a specific angle with the center line CIC (not parallel to the center line CIC) or a curved surface. The terminal width $W_T$ should be narrower than the maximum bump width $W_B$ in the x-direction for sweeping out the drifting conductive materials 91 toward the periphery of the driver IC ($W_B$ in FIGS. 10, 11A, and 11B will be defined as the maximum width in the x-direction of the bump, hereinafter). On the other hand, the bump thickness $t_B$ should be thicker than the terminal thickness $t_T$ of the terminal being connected thereto. The bump end facing the central line, CIC of the driver IC should protrude from the end of the terminal connected thereto, like the input-side bump 10a in FIG. 10. In each case of this structure, as the flow of the fluidized binder 90 passes smoothly by the end of the bump facing the center line CIC of the driver IC, the accumulation of the conductive materials 91 at this bump end are so suppressed that the aforementioned electrical short circuits between the bumps are prevented. This advantage will be significant when the present invention is applied to the bumps juxtaposed along a longer side of the rectangular shaped driver ICs (like the bumps 10a, 10b in FIG. 10). In this application, a juxtaposition of the bumps so as to arrange the center lines thereof in the width direction along the longer side of the driver IC (like the lines CBU in FIG. 10) substantially in parallel to each other makes the advantage of the present invention more significant. Additionally, the aforementioned relationship of $W_B > W_T$ provides another advantage for positioning the driver IC over the substrate during a mounting process thereof onto the terminals formed on the substrate.

Figure 11A:
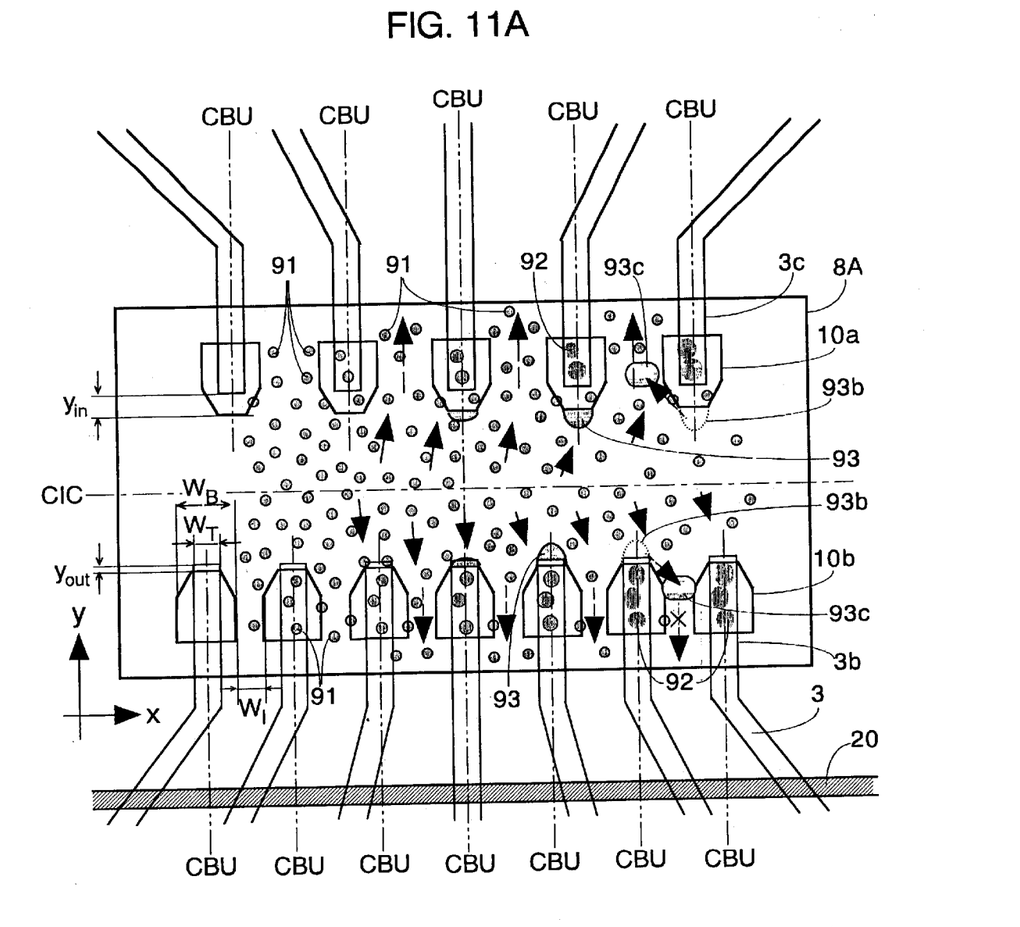
FIG. 11A is a plan view of a peripheral portion (for mounting a driver IC) of a substrate utilized for another liquid crystal display device according to the present invention for explaining the behaviors of conductive materials of an anisotropic conductive film thereat.
Figure 11B:
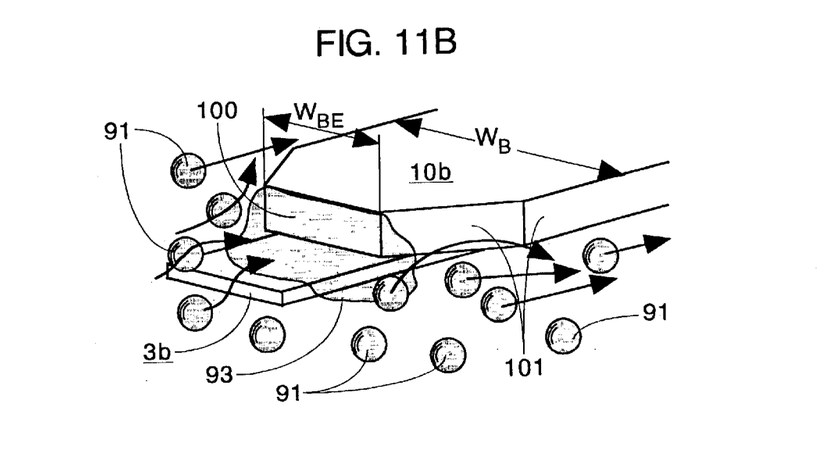
FIG. 11B is a detailed view of a facet confronting a central line CIC of the driver IC and a periphery thereof for explaining the behaviors of the conductive materials therearound.

FIG. 11A shows another example for applying the present invention to a bump having a plane facing the aforementioned center line CIC of the driver IC 8A. FIG. 11B provides an enlarged image of the end of the bump 10b at an end side of the terminal 3b (to which the bump 10b is connected) shown in FIG. 11A. As FIG. 11B shows, the bump of this example has a facet 100 facing the center line CIC of the driver IC 8A. Such a bump shape ensures a wider area for a conductive path between the bump and the terminal, but the facet 100 dams back the stream of the fluidized binder 90 more significantly than the other side surfaces 101 do. Therefore, the conductive materials 91 are accumulated at the facet and a cluster grows at this location. As shown in the output side (lower side) of the driver IC 8A in FIG. 11A, the cluster 93c may be released from its growth place 93b so as to clog a space between the bumps 10b, and finally makes a conductive path therebetween. However, the facet 100 facing the center line CIC in the example of FIG. 11A remains so much smaller than that being embodied in FIG. 9A that the cluster 93 never grows up to a size as large the size of the clusters 93a, 93c shown in FIG. 9A. Thus, if the interval of the juxtaposition of the bumps $W_I$ (being defined as a distance between both portions of the bump having maximum width $W_B$ thereof) is larger than the width of the facet 100 (i.e. the end width) $W_{BE}$, the released cluster 93c can be swept away without clogging the space between the bumps. This advantage is apparent from the input side (upper side) of the driver IC 8A in FIG. 11A, which shows that the cluster 93c passes through the space between the bumps 10a. As a result of the consideration based on FIGS. 11A, 11B the width $W_{BE}$ of the facet 100 facing the center line CIC of the driver IC 8A is recommended to be narrower than the interval $W_I$ of the bumps for this example.

As apparent from the foregoing explanation, it is preferable that each of the bumps be formed in a shape having a smooth curve from the central side of the driver IC toward a side extending away from the central side, as shown in FIG. 6, for discharging the conductive material 15 smoothly.

Accordingly, an electrical short circuit is prevented from occurring due to residue of the conductive material 15 between the adjacent bumps.

This feature offers a huge number of great advantages in the present state of the art, in which the trend is to narrow the gaps between adjacent bumps of a driver IC and reduce the area of each of the bumps, and in which it is necessary to increase the amount of the conductive material 15 to be mixed with the binder in the anisotropic conductive film (ACF).

Figure 7:
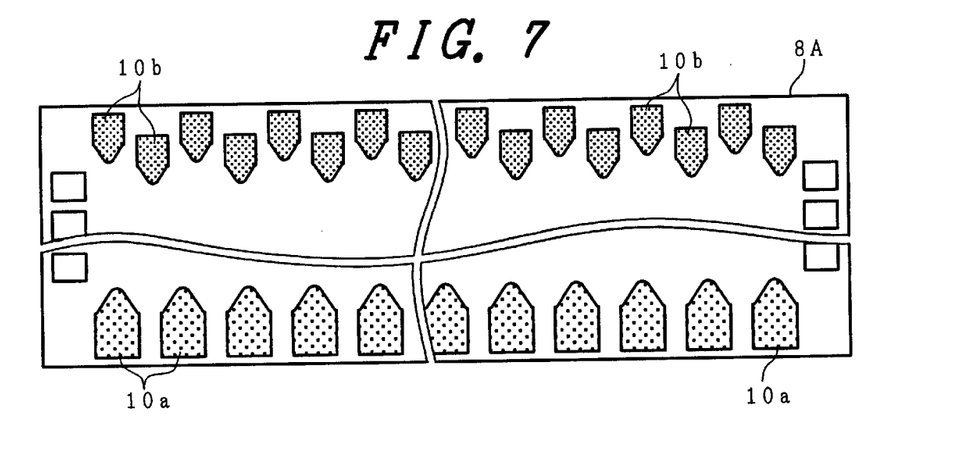
FIG. 7 is a plan view showing another embodiment of driver ICs of the liquid crystal display device according to the present invention.

FIG. 7 is a view showing another embodiment of the liquid crystal display device according to the present invention, and corresponds in general arrangement to FIG. 6. In FIG. 7, portions denoted by reference numerals identical to those shown in FIG. 6 have functions identical to those described above with reference to FIG. 6. The construction shown in FIG. 7 differs from that of FIG. 6 in the arrangement of output-side bumps.

Specifically, the output-side bumps are disposed not in a straight line in the direction of array thereof, but in a staggered arrangement.

By adopting this construction, as compared with the case of FIG. 6, if the spaces between the adjacent bumps are regarded as paths from the center to the outside of the driver IC 8A, the entrances of the paths can be made far wider.

Figure 8:
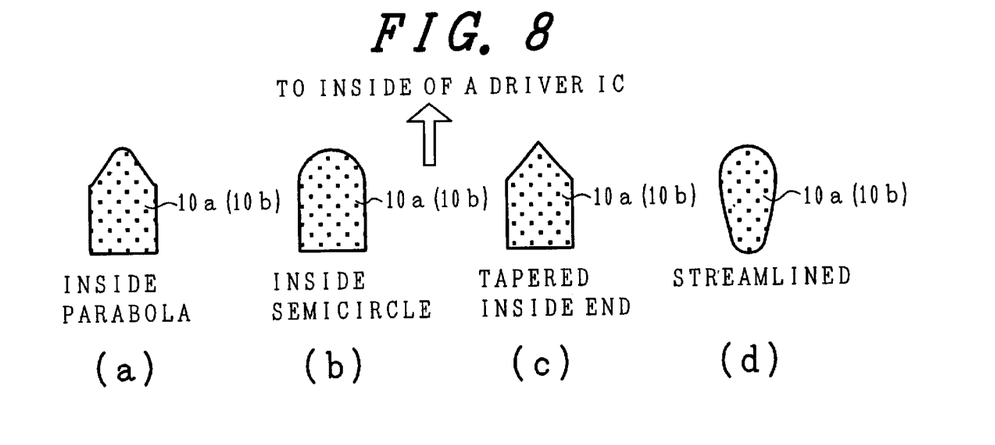
FIG. 8 is a plan view showing another embodiment of bumps of the driver IC of the liquid crystal display device according to the present invention.

As is apparent from the above description, assuming that the space between each bump and an adjacent bump is regarded as a path, only if the path is defined to be wide at its entrance and become gradually narrower will it be possible to avoid an electrical short circuit due to a conductive material of an anisotropic conductive film during thermocompression bonding. Therefore, the shapes of the bumps are not limited to those shown in either of FIGS. 6 or 7. Needless to say, it is possible to obtain similar advantages even with, for example, the shapes shown in FIGS. 8(a) to 8(d).

Although, in each of the above-described embodiments, all the bumps of each of the driver ICs 8A (similarly to the drivers IC 7A) have shapes different from conventional ones, the present invention can, of course, be applied to, for example, only the output-side bumps. This is because, as described above, the output-side bumps are larger in number and provide a smaller distance between adjacent bumps than the input-side bumps, so that an electrical short circuit due to the conductive material of the anisotropic conductive film easily occurs.

In addition, the above-described embodiments are constructed in which the present invention is applied to the driver ICs 8A and the driver ICs 7A. However, needless to say, the present invention may be applied to only the driver ICS 8A of the video signal lines 3. This is because the distance between adjacent ones of the video signal lines 3 is normally smaller than the distance between adjacent ones of the scanning signal lines 2, and, therefore, the distance between adjacent bumps of the. driver IC 8A may be smaller than the distance between adjacent bumps of the driver IC 7A.

Although the above description of each of the embodiments has referred to a so-called vertical electric field type of liquid crystal display device, the present invention can, of course, be applied to a so-called lateral electric field type of liquid crystal display device and the like. The lateral electric field type of liquid crystal display device is a liquid crystal display device in which a pixel electrode and a counter electrode which is spaced apart from the pixel electrode are provided in each pixel area on a liquid crystal-side surface of either one of the transparent substrates arranged to oppose each other with a liquid crystal interposed therebetween, and the optical transmissivity of the liquid crystal between these electrodes is controlled by an electric field generated between the electrodes (an electric field which has components parallel to the substrate). This lateral electric field type of liquid crystal display device does not at all differ from the liquid crystal display device illustrated in each of the embodiments in respect of the constructions of the driver ICs 7A and driver ICs 8A.

As is apparent from the foregoing description, according to the liquid crystal display device of the present invention, it is possible to avoid the occurrence of an electrical short circuit between adjacent bumps of driver ICS.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A liquid crystal display device comprising:
   driver ICs mounted on the liquid crystal display device with an anisotropic conductive film interposed therebetween,
   wherein each of said driver ICs has bumps arranged in such a manner that the width of a space between one of the bumps and another bump to which said one of the bumps is adjacent becomes larger toward a central side of each of said driver ICs.

2. A liquid crystal display device according to claim 1, wherein each of the bumps has a shape having a smooth curve from the central side of each of said driver ICs to a side away from the central side.

3. A liquid crystal display device according to claim 1, wherein scanning signal lines for supplying scanning signals and video signal lines for supplying video signals to the individual pixels are formed on a liquid crystal-side surface of either one of transparent substrates arranged to oppose each other with a liquid crystal interposed therebetween, and output-side bumps of said driver ICs are connected to the scanning signal lines and the video signal lines.

4. A liquid crystal display device according to claim 3, wherein the width of the space between one of the output-side bumps of each of said driver ICs and another bump of the output-side bumps of each of said driver ICs to which said one of the output-side bumps is adjacent becomes larger toward the central side of each of said driver ICs.

5. A liquid crystal display device according to claim 3, wherein the width of the space between one of bumps of each of said driver ICs connected to the video signal lines and another bump of the bumps of each of said driver ICs connected to the video signal lines to which said one of the bumps is adjacent becomes larger toward the central side of each of said driver ICs.

6. A liquid crystal display device according to claim 5, wherein a space width between one of the output-side bumps of each of said driver ICs connected to the video signal lines and another bump (of the output-side bumps of each of said driver ICs connected to the video signal lines) to which said one of the output-side bumps is adjacent becomes larger toward the central side of each of said driver ICs.

* * * * *